United States Patent [19]

Lenk

[11] Patent Number: 4,614,228

[45] Date of Patent: Sep. 30, 1986

[54] TRANSPORT UNIT FOR HOT STOCK

[75] Inventor: Rainer Lenk, Duisburg, Fed. Rep. of Germany

[73] Assignee: Mannesmann AG, Duesseldorf, Fed. Rep. of Germany

[21] Appl. No.: 712,351

[22] Filed: Mar. 15, 1985

[30] Foreign Application Priority Data

Mar. 15, 1984 [DE] Fed. Rep. of Germany ....... 3409738

[51] Int. Cl.⁴ ............................................ F28D 11/02
[52] U.S. Cl. ....................................... 165/89; 165/47; 432/246
[58] Field of Search ................... 165/89, 47; 432/236, 432/245, 246

[56] References Cited

U.S. PATENT DOCUMENTS

| | | | |
|---|---|---|---|
| 2,538,985 | 1/1951 | Snyder | 165/89 |
| 2,750,806 | 6/1956 | Hobbs | 165/47 X |
| 3,120,867 | 2/1964 | Nash | 165/89 X |
| 3,752,227 | 8/1973 | Bulson | 165/89 |

FOREIGN PATENT DOCUMENTS 2629039  1/1978  Fed. Rep. of Germany .

Primary Examiner—William R. Cline
Assistant Examiner—Richard R. Cole
Attorney, Agent, or Firm—Ralf H. Siegemund

[57] ABSTRACT

A transport unit for elongated hot metallic stock, includes a roll or roller having a cooling duct system near its periphery and radially oriented feed and discharge ducts for coolant; a journal pin extends from the roll or roller to one axial end thereof and carrying a gear, the journal pin is traversed by a bore extending into the interior of the roll or roller and is fluid conductively communicating with the coolant discharge duct; a gear transmission including a casing is provided and the journal pin is mounted for rotation by means of roller bearings in the casing, the transmission gear includes the gear on the journal pin so that the journal pin constitutes the output shaft of the transmission gear; a motor is secured to the casing and has its output shaft drivingly connected to the input shaft of the transmission gear; a feed tube for coolant extends through the bore and into the roller for fluid conductive connection with the radial feed duct and being connected to a coolant feed supply; additional cooling ducts traverse the casing particularly the surface thereof and is fluid conductively connected to the bore; the coolant is discharged from the duct system in the casing through a highest point.

4 Claims, 1 Drawing Figure

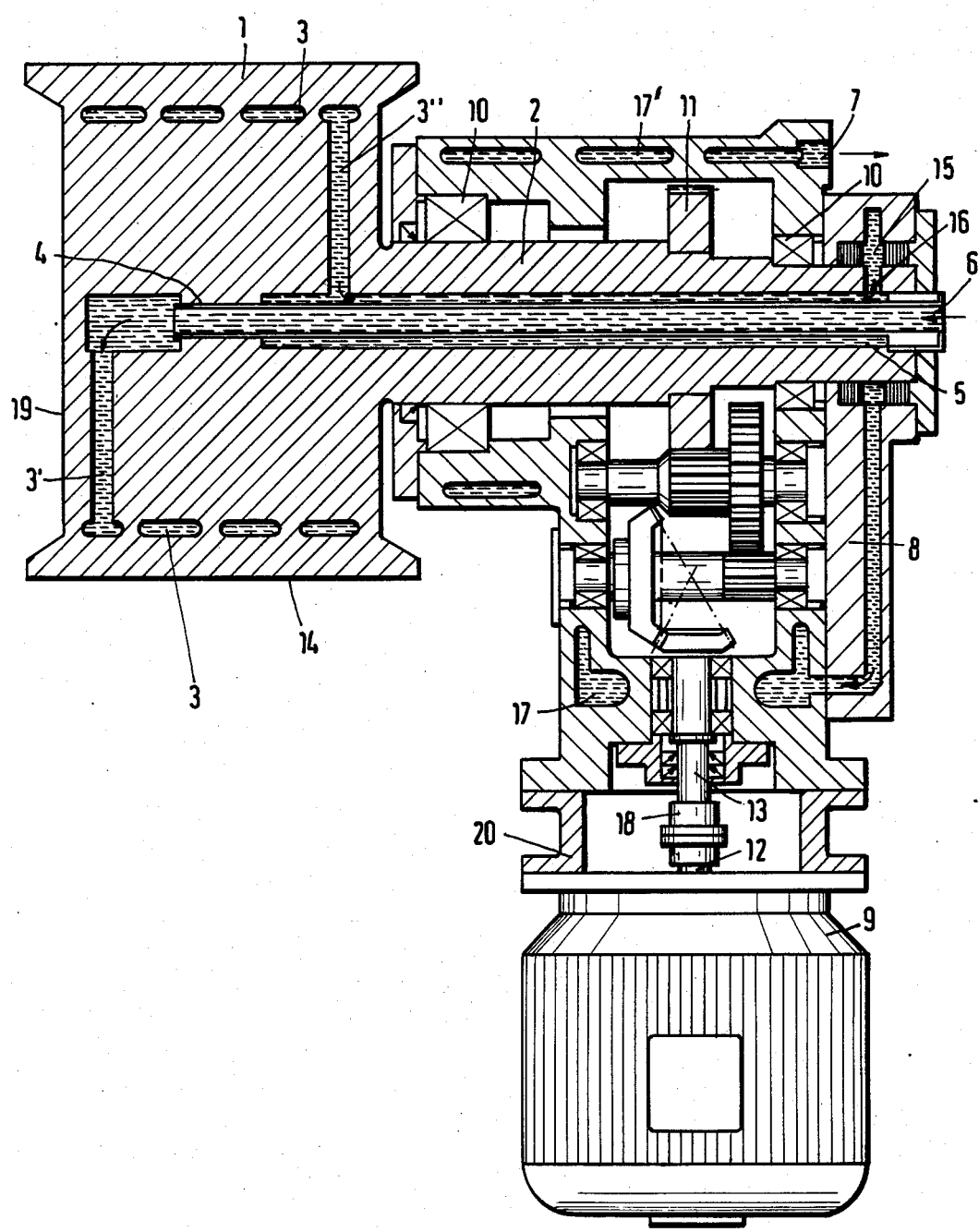

TRANSPORT UNIT FOR HOT STOCK

BACKGROUND OF THE INVENTION

The present invention relates to a transport and conveyer facility for moving elongated hot metallic stock and more particularly the invention relates to a transport and conveyer unit which includes a roll or roller being connected to a motor through a transmission and to be used for moving strands or ingots within a machine for continuous casting.

Generally speaking individually driven rolls or rollers are known, including rolls whose rotational speed is to be determined by an intermediate transmission. In such instances it is common practice to fasten the roll or roller directly upon the drive or output pinion of the respective transmission (see for example German printed patent application No. 2,629,039). Such a transport and drive units are compact but have the disadavantage that the heat of the stock to be moved by means of the roll or roller migrates directly into the roll or roller and from there into the drive pin as well as into the transmission. Also, the radiation heat is quite extensive under the circumstances and impinges directly upon the casing of the transmission. In either case the transmission will become very hot. Considering the extreme working conditions of such a system such as ingot temperatures of 900 and 1250 degrees centigrade, and considering furthermore that the transport speed is fairly low, such as half a meter to four meters per minute and considering still further that the transport may even stop, it is quite apparent that the thermal load on this device aggregate including the transmission is very and conceivably irregularly high. It is possible for instance that under such high temperature conditions the lubricant used through out this drive aggregate suddenly loses its lubricative capability. The transmission casing may warp or become otherwise distorted. As a consequence the transmission may loose alignment and registry of elements and errors in the transmission as far as bearing and gear meshing is concerned are conceivable. This in turn would mean that the transmission is no longer as is desired and even required for purposes of adequately withdrawing of the ingot from the mold which means that the casting process requiring very accurate guidance and moving of the casting strand or ingot is no longer subject to the requisite accuracy.

In order to avoid any undesired heating of the transmission driving one of the transport rolls or rollers in the machine for continuous casting it has been proposed to cool these rolls with water. This kind of cooling is possible only in the generally wet zones of the equipment because the cooling water which does not evaporate will flow from these rolls or rollers into the construction parts underneath. However the presence of secondary cooling with spray water as far as the withdrawal path of the casting is concerned is today no longer an indispensable requirement.

DESCRIPTION OF THE INVENTION

It is an object of the present invention to avoid the aforementioned drawbacks but to maintain a compact construction of a transport roll or roller, a transmission, and a drive motor for the transmission and the roll or roller so as to establish a transport unit which remains operational even if subjected to heat in various forms and even if the transport speeds the roll or roller is to be quite low.

It is therefore a particular object of the present invention to provide a new and improved transport unit for elongated metallic hot stock being releasable fastened to a frame within a transport path and being comprised of a roll or roller, a transmission gear and a motor or engine connected thereto.

In accordance with the preferred embodiment of the present invention it is suggested to provide the roll or roller with a journal pin to serve as output shaft of the transmission gear which pin is journaled in the transmission casing through roller bearings; furthermore the journal pin is provided with a central bore which extends into the roll or roller and a tube is provided inside of that bore in concentric relation thereto and being connected to a water supply. Moreover this tube inside the roll or roller is connected to a channel and duct system extends through and into the roll or roller to locations close to the periphery of the roll or roller with a return path being provided towards the gap between the bore and the tube; also the journal pin is to have radial bore in the area of its front face which merges with an annular channel of the casing of the transmission to be continued in cooling channel and duct system inside the wall of that casing and being connected to a discharge point for the cooling water. The discharge outlet for the water should be positioned at the highest location of the casing. Preferably the roll or roller is journaled through air bearings and the casing of the transmission is constructed in two parts whereby the cooling channels in that casing are in fact recesses in respective opposing surfaces of the two parts.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

the FIGURE illustrates a transport unit constructed in accordance with the preferred embodiment of the present invention for practicing the best mode thereof.

Proceeding now to the detailed description of the drawings the FIGURE illustrates a transport roll or roller 1 to be used in a machine for continuous casting, for example for withdrawing a continuously cast ingot and strand material from the mold. This roll or roller is cantelevered or mounted for rotation in overhung disposition having a single journal pin 2. In the present case the surface 14 of the roll is smooth and cylindrical but any desired contour can be used for matching the roll better to the contour of the stock to be transported. There may be a central indent or shallow groove for purposes of transporting and moving round castings.

The journal pin 2 is received in a transmission casing 8 and is mounted for rotation therein through roller bearings 10. The roller bearings are particularly disposed at one end of the housing and multiple roller bearings are provided to establish stable support for the pin and the appended roll or roller 1.

A gear 11 is secured to the journal pin 2 meshing with other gears directly and indirectly of the transmission contained in the casing 8. This way pin 2 becomes the output shaft of the transmission. The input side of the transmission is connected to a motor 9 having a flange connection 20 to the casing 8. The motor 9 is provided with an output shaft 12 which is connected to the input shaft 13 of the transmission gear through coupling or clutch 18.

The stock moved with the aid of the roll or roller 1 is quite hot and there is conductive heat transport from that stock into the illustrated system particularly directly into the roll or roller 1 and from there the casing 8. Also, all these parts are affected by thermal radiation. The effect of this heat flow is eliminated by providing a common circuit for coolant to flow through the roll or roller 1 as well as through the case or casing 8.

The common cooling circuit is established through a water inlet 6 which is connected to a tube 4. Tube 4 is constructed as a siphon tube and penetrates the journal pin 2 in its entirety and projects also well in the interior of the roll or roller 1. The journal pin 2 and a significant portion of the roll or roller 1 is provided with a central bore 5 which in fact receives this tube 4.

The cooling circuit is continued at the end of tube 4 by a radical channel 3' being disposed close to the free axial end 19 of the roll or roller 1. This radial feed duct 3' feeds a basically helically arranged duct 3 extending fairly close to the surface 14 of the roller and ends in a radially oriented return duct 3''. The latter in turn terminates in the bore 5 i.e. the return flow of the coolant includes the annular gap space between the wall of bore 5 and the outer surface of tube 4.

A radial duct is provided at the end of bore 5, being in fact near the free end of the journaled pin 2. This radial duct 16 ends in an annular channel 15 of and in the casing 8. The annular channel 15 in turn connects to a cooling duct system 17 being vis-a-vis the rotational arrangement as far as the pin 2 and the roller 1 is concerned and being oriented in radial outer direction and terminating in an annular cooling duct portion 17' that loops basically around the shaft 13. The cooling duct system 17 is thus continued in that portion of the casing which is arranged basically around the axis of roller 1 and journal pin 2. In other words the cooling duct system 17 including portion 17' is arranged more or less throughout the casing 8 as close to its surface as possible so as to provide for adequate cooling of all parts of that casing. The cooling system terminates in a discharge point 7 being in fact situated in the highest point of the entire cooling system as far as the case 8 is concerned. This way one avoids the formation of air or other gas bubbles in the cooling system 17 which may be trapped therein and provide undesired thermal insulation.

The transmission case 8 is in fact constructed in a two part fashion such that the various duct portions such as 17' are established as indents in surfaces which upon assembly of the casing face each other to complete the respective ducts.

The invention is not limited to the embodiments described above but all changes and modifications thereof, not constituting departures from the spirit and scope of the invention, are intended to be included.

What is claimed is:

1. A transport unit for elongated hot metallic stock comprising:
   a roll or roller having a cooling duct system near its periphery and having radially oriented feed and discharge ducts for coolant;
   a journal pin extending from the roll or roller to one axial end thereof and carrying a gear, said journal pin being traversed by a bore extending into the interior of the roll or roller and fluid conductively communicating with the coolant discharge duct;
   a gear transmission including a casing, said journal pin being mounted for rotation by means of roller bearings in said casing, said transmission gear including gear means and further including said gear on said journal pin so that said journal pin constitutes the output shaft of the transmission gear, said transmission gear having an input shaft;
   a motor secured to said casing and having a shaft drivingly connected to the input shaft of said transmission gear;
   a feed tube for coolant extending through said boar and into said roller for fluid conductive connection with said radial feed duct and being connected to a coolant feed supply;
   cooling ducts traversing said casing and being fluid conductively connected to said bore outside said tube; and
   means for discharging coolant from the duct system in the casing.

2. Transport unit as in claim 1, said journal pin being mounted in said case in overhung cantilever fashion.

3. Transport unit as in claim 1, said casing being biparted the ducts of the cooling system in the case being constituted by indents in surfaces facing each other.

4. Transport unit as in claim 1, said discharge outlet being situated at the highest point of the casing.

* * * * *